(12) United States Patent  
Momma

(10) Patent No.: US 11,914,689 B2  
(45) Date of Patent: Feb. 27, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Takashi Momma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 443 days.

(21) Appl. No.: 17/156,721

(22) Filed: Jan. 25, 2021

(65) Prior Publication Data

US 2022/0083632 A1 Mar. 17, 2022

(30) Foreign Application Priority Data

Sep. 17, 2020 (JP) ................................. 2020-156694

(51) Int. Cl.
*G06F 21/31* (2013.01)
*G06F 9/50* (2006.01)
*G06F 21/62* (2013.01)

(52) U.S. Cl.
CPC .............. *G06F 21/31* (2013.01); *G06F 9/505* (2013.01); *G06F 21/6218* (2013.01); *G06F 2221/2101* (2013.01)

(58) Field of Classification Search
CPC ...... G06F 21/31; G06F 9/505; G06F 21/6218; G06F 2221/2101; G06F 21/604
See application file for complete search history.

(56) References Cited

U.S. PATENT DOCUMENTS

| | | | | |
|---|---|---|---|---|
| 6,056,786 A * | 5/2000 | Rivera | .................. | G06F 21/105 709/229 |
| 6,161,182 A * | 12/2000 | Nadooshan | ............. | G06F 21/31 713/168 |
| 6,178,427 B1 * | 1/2001 | Parker | ................. | G06F 11/2066 |
| 7,203,909 B1 * | 4/2007 | Horvitz | ................. | G06F 16/954 715/765 |
| 7,661,136 B1 * | 2/2010 | Spielman | ................ | H04L 43/00 726/22 |
| 7,689,626 B2 * | 3/2010 | Miller | ..................... | G06F 16/10 714/15 |
| 7,840,578 B2 * | 11/2010 | Ha | ....................... | G06F 11/0751 709/219 |
| 8,234,302 B1 * | 7/2012 | Goodwin | .............. | H04L 63/107 726/28 |
| 8,402,541 B2 * | 3/2013 | Craioveanu | ........... | G06F 21/563 713/188 |
| 9,027,128 B1 * | 5/2015 | Oliver | ................. | H04L 63/1408 726/22 |

(Continued)

FOREIGN PATENT DOCUMENTS

JP H06-187213 A 7/1994
JP 2019-114076 A 7/2019

*Primary Examiner* — Aravind K Moorthy
(74) *Attorney, Agent, or Firm* — Oliff PLC

(57) ABSTRACT

An information processing apparatus includes: a processor configured to: when detecting an unauthorized access to a file or a directory, set a range including at least the specific file or directory subjected to the unauthorized access as a recording range in which access logs are recorded; and after setting the recording range, update or maintain the recording range according to at least a load on a resource used to record the access logs.

20 Claims, 6 Drawing Sheets

(56) References Cited

U.S. PATENT DOCUMENTS

| | | | |
|---|---|---|---|
| 9,064,130 B1* | 6/2015 | Asheghian | G06F 21/6281 |
| 9,077,758 B1* | 7/2015 | McGovern | H04L 63/14 |
| 9,166,993 B1* | 10/2015 | Liu | H04L 63/1425 |
| 9,323,930 B1* | 4/2016 | Satish | G06F 21/566 |
| 9,367,579 B1* | 6/2016 | Kumar | G06F 16/1734 |
| 9,420,002 B1* | 8/2016 | McGovern | H04L 63/20 |
| 9,536,099 B2* | 1/2017 | Iwadate | H04L 63/20 |
| 9,588,834 B1* | 3/2017 | Dikhit | G06F 11/0754 |
| 9,679,139 B1* | 6/2017 | Monastyrsky | G06F 21/53 |
| 9,813,443 B1* | 11/2017 | Subramanian | G06F 21/561 |
| 9,830,469 B1* | 11/2017 | Anderson | G06F 21/44 |
| 9,830,939 B1* | 11/2017 | Hamilton | G11B 20/1217 |
| 9,998,470 B1* | 6/2018 | Hockings | G06F 21/556 |
| 10,069,757 B1* | 9/2018 | Young | H04L 41/0897 |
| 10,210,329 B1* | 2/2019 | Malik | H04L 63/1466 |
| 10,397,261 B2* | 8/2019 | Ikuse | G06F 16/22 |
| 10,523,696 B2* | 12/2019 | Uchiyama | G06F 11/3476 |
| 10,534,933 B1* | 1/2020 | Roundy | G06F 21/6227 |
| 11,245,679 B1* | 2/2022 | Su | G06K 19/06037 |
| 2003/0055809 A1 | 3/2003 | Bhat | G06F 16/9014 |
| 2003/0196193 A1* | 10/2003 | Kuzmin | G06F 11/3452 717/130 |
| 2003/0236992 A1* | 12/2003 | Yami | H04L 43/00 726/23 |
| 2004/0236747 A1* | 11/2004 | Swimmer | G06F 16/25 707/999.009 |
| 2005/0086634 A1* | 4/2005 | Bates | G06F 11/328 707/E17.141 |
| 2005/0089063 A1* | 4/2005 | Haruna | H04L 43/0876 370/468 |
| 2005/0138483 A1* | 6/2005 | Hatonen | G06F 21/552 714/45 |
| 2005/0198534 A1* | 9/2005 | Matta | H04W 12/06 726/5 |
| 2005/0223164 A1* | 10/2005 | Kitamura | G06F 21/31 711/112 |
| 2006/0037064 A1* | 2/2006 | Jeffries | H04L 63/1441 726/4 |
| 2006/0277162 A1* | 12/2006 | Smith | G06F 16/24 |
| 2007/0130148 A1* | 6/2007 | Wu | G06F 21/604 707/999.009 |
| 2007/0136232 A1* | 6/2007 | Nemoto | G06F 16/2477 |
| 2007/0157292 A1* | 7/2007 | Danner | G06F 21/604 709/225 |
| 2007/0174911 A1* | 7/2007 | Kronenberg | G06F 21/56 726/22 |
| 2007/0208857 A1* | 9/2007 | Danner | H04L 63/102 709/226 |
| 2007/0214192 A1* | 9/2007 | Murakami | H04L 43/0817 |
| 2007/0250818 A1* | 10/2007 | Boney | G06F 21/566 717/124 |
| 2007/0271220 A1* | 11/2007 | Carter | G06F 16/9535 |
| 2007/0300309 A1* | 12/2007 | Naito | G06F 21/10 726/27 |
| 2008/0294384 A1* | 11/2008 | Fok | G06F 11/30 702/187 |
| 2009/0044024 A1* | 2/2009 | Oberheide | H04L 63/145 713/188 |
| 2009/0271448 A1* | 10/2009 | Chen | G06F 16/162 |
| 2009/0292742 A1* | 11/2009 | Morgan | G06F 11/3476 |
| 2009/0300150 A1* | 12/2009 | Rudy | H04L 63/1425 709/222 |
| 2010/0031346 A1* | 2/2010 | Kano | G06F 21/608 726/19 |
| 2010/0061661 A1* | 3/2010 | Kamimaeda | G06F 16/532 382/298 |
| 2010/0083366 A1* | 4/2010 | Challener | G06F 21/6218 726/17 |
| 2010/0146582 A1* | 6/2010 | Jaber | G06F 21/6218 726/1 |
| 2010/0269153 A1* | 10/2010 | Kato | H04L 9/321 726/3 |
| 2010/0274759 A1* | 10/2010 | Takeuchi | G06F 16/275 707/624 |
| 2011/0231408 A1* | 9/2011 | Sasaki | G06F 21/6245 707/748 |
| 2012/0109895 A1* | 5/2012 | Zwilling | G06F 16/2308 707/648 |
| 2012/0192267 A1* | 7/2012 | Aizawa | G06F 21/6218 726/17 |
| 2012/0331561 A1* | 12/2012 | Broadstone | G06F 21/31 726/26 |
| 2013/0263222 A1* | 10/2013 | Kobayashi | H04L 63/105 726/4 |
| 2014/0053125 A1* | 2/2014 | DeLuca | G06F 8/71 717/101 |
| 2014/0189098 A1* | 7/2014 | MaGill | H04L 63/104 709/224 |
| 2014/0373136 A1* | 12/2014 | Igelka | H04L 63/1425 726/22 |
| 2014/0373167 A1* | 12/2014 | Matsumura | G06F 21/73 726/26 |
| 2016/0026347 A1* | 1/2016 | Gehring | G06F 3/0482 715/810 |
| 2016/0085790 A1* | 3/2016 | Gukal | G06F 16/31 707/741 |
| 2016/0094541 A1* | 3/2016 | Tan | H04L 63/0853 713/156 |
| 2016/0127390 A1* | 5/2016 | Lai | H04L 63/1416 726/23 |
| 2016/0210450 A1* | 7/2016 | Su | G06F 21/552 |
| 2016/0224375 A1* | 8/2016 | Chiao | G06F 11/348 |
| 2016/0266796 A1* | 9/2016 | Iwata | G06F 3/0685 |
| 2016/0277436 A1* | 9/2016 | Lim | H04L 63/1441 |
| 2016/0292395 A1* | 10/2016 | Pintaux | H04N 21/25891 |
| 2016/0366171 A1* | 12/2016 | Yagi | H04L 63/1425 |
| 2017/0093892 A1* | 3/2017 | Prokudin | G06F 21/56 |
| 2017/0093977 A1* | 3/2017 | Amemiya | H04L 67/568 |
| 2017/0102766 A1* | 4/2017 | Hayashida | G06F 3/147 |
| 2017/0134403 A1* | 5/2017 | Hearn | H04L 63/1425 |
| 2017/0163684 A1* | 6/2017 | Brucker | H04L 63/20 |
| 2017/0177496 A1* | 6/2017 | Han | G06F 12/0873 |
| 2017/0177641 A1* | 6/2017 | Von Drakk | G06F 16/2282 |
| 2017/0180416 A1* | 6/2017 | Giura | G06F 9/45558 |
| 2017/0185772 A1* | 6/2017 | Hatta | G06F 21/56 |
| 2017/0295157 A1* | 10/2017 | Chavez | H04L 9/3239 |
| 2018/0213020 A1* | 7/2018 | Kakutani | H04L 67/025 |
| 2018/0322040 A1* | 11/2018 | Nikoloudakis | G06F 3/0652 |
| 2019/0034652 A1* | 1/2019 | Kludy | G06F 21/6218 |
| 2019/0042143 A1* | 2/2019 | Trika | G06F 11/323 |
| 2019/0042736 A1* | 2/2019 | Krebs | H04L 63/1491 |
| 2019/0098037 A1* | 3/2019 | Shenoy, Jr. | H04L 63/1441 |
| 2019/0280918 A1* | 9/2019 | Hermoni | H04L 41/069 |
| 2019/0384756 A1* | 12/2019 | Li | G06F 17/40 |
| 2020/0120138 A1* | 4/2020 | Sanders | G06F 18/2323 |
| 2020/0167485 A1* | 5/2020 | Gupta | G06F 16/24573 |
| 2020/0210565 A1* | 7/2020 | Sidorov | G06F 21/554 |
| 2020/0220795 A1* | 7/2020 | Krishna | H04L 43/0894 |
| 2020/0250019 A1* | 8/2020 | Gao | G06F 11/302 |
| 2020/0285417 A1* | 9/2020 | Onodera | G06F 3/0659 |
| 2020/0310733 A1* | 10/2020 | Fujimura | G06F 3/04883 |
| 2020/0314109 A1* | 10/2020 | Subhash | G06F 21/6218 |
| 2020/0334356 A1* | 10/2020 | Thompson | G06F 21/552 |
| 2020/0402063 A1* | 12/2020 | Tolpin | G06Q 20/4016 |
| 2021/0034497 A1* | 2/2021 | Peterson | G06F 11/324 |
| 2021/0209033 A1* | 7/2021 | Arumugam | G06F 8/62 |
| 2021/0232596 A1* | 7/2021 | Qi | G06F 16/27 |
| 2021/0303684 A1* | 9/2021 | Makhlevich | H04L 63/20 |
| 2021/0344697 A1* | 11/2021 | Kuroki | H04L 63/1433 |
| 2021/0377275 A1* | 12/2021 | Grønvik | H04L 63/101 |
| 2022/0035806 A1* | 2/2022 | Horesh | G06F 16/2462 |

\* cited by examiner

FIG. 4

| SCOPE OF RECORDING RANGE | DEFINITION OF RECORDING RANGE | TARGET EXAMPLE |
|---|---|---|
| BROAD | EVERYTHING UNDER ROOT DIRECTORY (/) | EVERYTHING UNDER / (-r) |
| ↕ | EVERYTHING UNDER UPPER DIRECTORY OF SPECIFIC FILE SUBJECTED TO UNAUTHORIZED ACCESS | EVERYTHING UNDER /var/www/ (-r) |
| ↕ | EVERYTHING UNDER DIRECTORY OF SPECIFIC FILE SUBJECTED TO UNAUTHORIZED ACCESS | EVERYTHING UNDER /var/www/html/ (-r) |
| ↕ | FILES RIGHT UNDER DIRECTORY OF SPECIFIC FILE SUBJECTED TO UNAUTHORIZED ACCESS AND GRAND CHILD FILES | /var/www/html/* AND /var/www/html/*/* |
| ↕ | FILES RIGHT UNDER DIRECTORY OF SPECIFIC FILE SUBJECTED TO UNAUTHORIZED ACCESS | /var/www/html/* |
| NARROW | SPECIFIC FILE SUBJECTED TO UNAUTHORIZED ACCESS | /var/www/html/index.html |

FIG. 8

| PROTOCOL | RELATED DIRECTORY |
|---|---|
| HTTPS | /var/www/<br>/etc/httpd/ |
| IPSEC | /etc/ipsec/<br>/tmp/conf/ipsec/ |
| SMB | /etc/smb.conf.d/<br>/share/smb/ |
| ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-156694 filed Sep. 17, 2020.

BACKGROUND

(i) Technical Field

The present disclosure relates to an information processing apparatus and a non-transitory computer readable medium.

(ii) Related Art

JP-A-2019-114076 describes an information processing system capable of selectively recording histories of highly important files.

SUMMARY

Aspects of non-limiting embodiments of the present disclosure relate to limiting a use of resources required for recording as compared with a configuration in which all acquired access logs are recorded, and increase a potential of acquiring an access log related to unauthorized access as compared with a configuration in which only access logs within a predetermined range are recorded.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: when detecting an unauthorized access to a file or a directory, set a range including at least the specific file or directory subjected to the unauthorized access as a recording range in which access logs are recorded; and after setting the recording range, update or maintain the recording range according to at least a load on a resource used to record the access logs.

BRIEF DESCRIPTION OF THE DRAWINGS

Exemplary embodiment(s) of the present disclosure will be described in detail based on the following figures, wherein:

FIG. 4 shows an example of a predetermined prior definition of the recording range;

FIG. 8 shows another example of the predetermined prior definition of the recording range.

DETAILED DESCRIPTION

First Exemplary Embodiment

Hereinafter, a multifunction apparatus 10 according to the present exemplary embodiment will be described. The multifunction apparatus 10 is an example of an information processing apparatus. Examples of the information processing apparatus are not limited to the multifunction apparatus 10, but may include a personal computer (PC), a smart phone, and a tablet.

Figure 1:
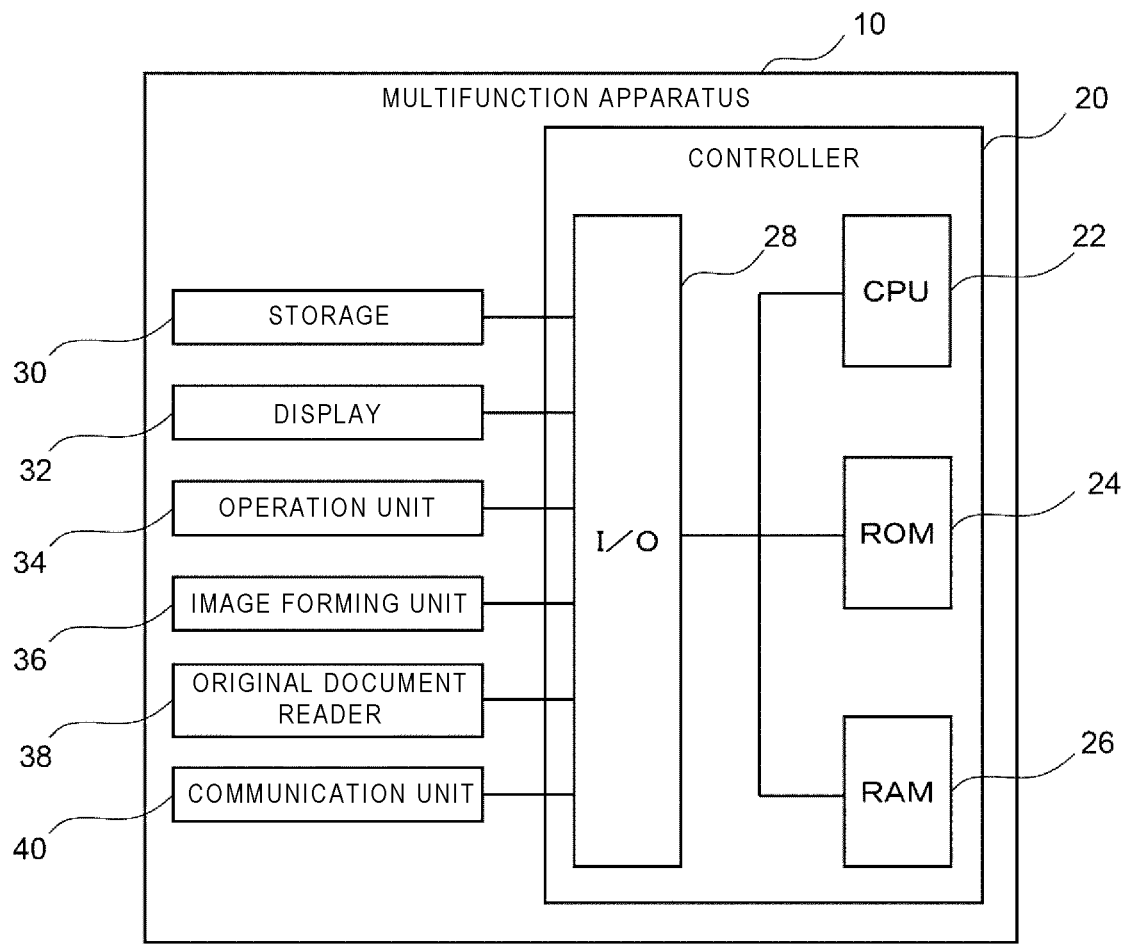
FIG. 1 is a block diagram showing a hardware configuration of a multifunction apparatus.

FIG. 1 is a block diagram showing a hardware configuration of the multifunction apparatus 10.

As shown in FIG. 1, the multifunction apparatus 10 includes a controller 20 that controls operation of the multifunction apparatus 10. The controller 20 includes a central processing unit (CPU) 22, a read only memory (ROM) 24, a random access memory (RAM) 26, and an input and output interface (I/O) 28 that are connected via a bus in a manner of being able to communicate with each other.

The CPU 22 is a central processing unit, executes various programs, and controls units. That is, the CPU 22 reads a program from the ROM 24 or a storage 30 to be described later, and executes the program using the RAM 26 as a work area. The CPU 22 controls the above described elements and performs various arithmetic processing according to the program recorded in the ROM 24 or the storage 30. In the first exemplary embodiment, the ROM 24 or the storage 30 stores an information processing program for updating or maintaining a recording range. The information processing program will be described later. The information processing program may be installed in the multifunction apparatus 10 in advance. Alternatively, the information processing program may be stored in a nonvolatile storage medium or being distributed via a network, and then be appropriately installed in the multifunction apparatus 10. Examples of the non-volatile storage medium include a CD-ROM, a magnetooptical disc, a hard disk drive (HDD), a DVD-ROM, a flash memory, and a memory card.

The ROM 24 stores various programs and various data. The RAM 26 serves as a work area that temporarily stores a program or data.

The storage 30, a display 32, an operation unit 34, an image forming unit 36, an original document reader 38, and a communication unit 40 are connected to the I/O 28. These units are able to communicate with the CPU 22 via the I/O 28.

The storage 30 is implemented by a storage device such as an HDD, a solid state drive (SSD), or a flash memory, and stores various programs and various data.

The display 32 is, for example, a liquid crystal display (LCD) or an organic electro luminescence (EL) display. The display 32 integrally includes a touch panel.

The operation unit 34 is provided with various operation keys such as a numeric keypad or a start key.

The display 32 and the operation unit 34 receive various instructions from a user of the multifunction apparatus 10 (hereinafter, referred to as an "end user"). The various instructions include, for example, an instruction to start reading the original document and an instruction to start copying the original document. The display 32 displays various information such as a result of processing executed in response to the instruction received from the end user and a notification of the processing.

The original document reader 38 captures original documents placed on a sheet feeding table of an automatic document feeder (not shown) one by one, optically reads the captured original documents, and thereby obtains image information. The automatic document feeder is provided on an upper part of the multifunction apparatus 10. Alternatively, the original document reader 38 optically reads an original document placed on a table such as a platen glass and thereby obtains the image information.

The image forming unit 36 forms an image on a recording medium such as a paper based on the image information obtained by the original document reader 38 reading the original document or image information obtained from an external PC or the like connected via a network.

The communication unit 40 is an interface for the multifunction apparatus 10 to communicate with an external PC or the like. The communication complies with, for example, a wired communication standard such as Ethernet (registered trademark) or FDDI, or a wireless communication standard such as 4G, 5G, or Wi-Fi (registered trademark).

When executing the above information processing program, the multifunction apparatus 10 uses the above hardware resources (see FIG. 1) to execute processing based on the information processing program. The hardware resources of the multifunction apparatus 10 are examples of a "resource".

Figure 2:
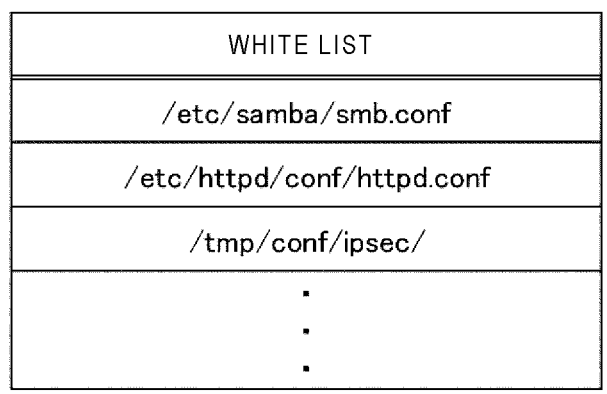
FIG. 2 shows an example of a white list.

FIG. 2 shows a white list of files or directories to which access is permitted. The white list is predetermined as a system of the multifunction apparatus 10 at the time of manufacture and cannot be freely edited by the end user. For example, the white list shown in FIG. 2 lists files or directories that are permitted to be accessed, such as "/etc/samba/smb.conf" and "/etc/httpd/conf/httpd.conf".

In the first exemplary embodiment, among accesses to files or directories of the multifunction apparatus 10 via a network such as the Internet, an access to a file or directory not listed in the white list shown in FIG. 2 is detected as unauthorized access by the CPU 22. The "access" here includes referring to a target file or a target directory and tampering with, reading, and deleting the target file or the target directory. Therefore, for example, when an access to "/var/www/html/index.html" not listed in the white list is performed, the CPU 22 detects the access to the file as an unauthorized access.

Here, when the multifunction apparatus 10 detects the unauthorized access, the multifunction apparatus 10 shifts from a normal mode before detecting the unauthorized access to a detection mode in which an operation of a job such as copying, printing, or scanning is continued while recording an access log related to the unauthorized access. In the detection mode, more access logs are recorded than in the normal mode in order to record access logs that are useful for investigating a cause.

The more access logs are recorded, the more effectively the cause is investigated. However, recording all acquired access logs may hinder functioning of the multifunction apparatus 10, for example, may delay other processing.

A load on the hardware resources (see FIG. 1) of the multifunction apparatus 10 differs depending on a usage environment of the end user. Accordingly, when only access logs within a predetermined range are recorded, an access log useful for investigating the cause may be missed. Also, recording of access logs only within a predetermined range is not desirable remarkably when an example of the information processing apparatus is the multifunction apparatus 10 instead of a computer apparatus such as a PC. This is because the multifunction apparatus 10 does not allow the end user to know a directory structure, unlike the computer apparatus such as the PC.

Figure 3:
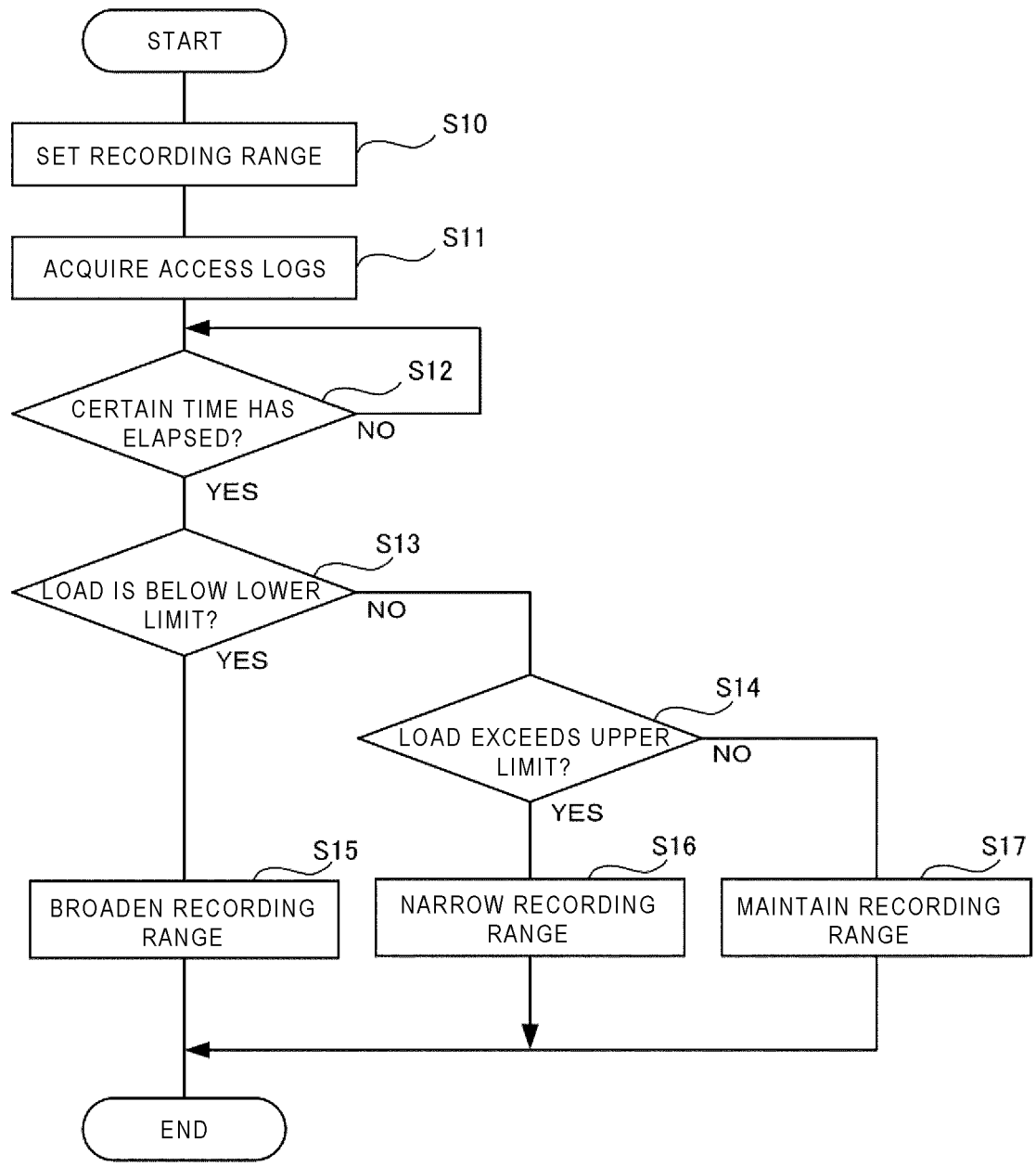
FIG. 3 is a first flowchart of processing for updating or maintaining a recording range.

Therefore, the multifunction apparatus 10 in the first exemplary embodiment performs processing in a flowchart shown in FIG. 3 in order to fully exert functions such as copying, printing, and scanning while reducing a security risk that a file is tampered with due to unauthorized access.

FIG. 3 is a flowchart of processing for updating or maintaining a recording range for dynamically recording access logs based on the usage environment of the end user. The CPU 22 reads the information processing program from the ROM 24 or the storage 30, loads the information processing program into the RAM 26 for execution, and thereby the processing is performed by the multifunction apparatus 10.

In step S10 shown in FIG. 3, the CPU 22 sets a recording range. Then, the processing proceeds to step S11. In the first exemplary embodiment, when the CPU 22 detects an unauthorized access, the CPU 22 sets a recording range including at least a specific file or directory subjected to the unauthorized access. Details thereof will be described below.

FIG. 4 shows an example of a predetermined prior definition of the recording range. As an example, FIG. 4 shows a prior definition when a specific file subjected to unauthorized access is "/var/www/html/index.html".

FIG. 4 shows that the set recording range becomes broader toward an upper part of the table and becomes narrower toward a lower part of the table. For example, at the uppermost part of the table, a target example is "everything under/(-r)", which means that all files or directories under the root directory (/) are set as the recording range. At the lowermost part of the table, the target example is "/var/www/html/index.html", which means that only a specific file subjected to the unauthorized access is set as the recording range.

In the first exemplary embodiment, the recording range set by the CPU 22 in step S10 is all files or directories under a directory of the specific file subjected to unauthorized access. Therefore, in step S10, the CPU 22 sets "everything under /var/www/html/(-r)" shown in FIG. 4 as the recording range.

Returning to FIG. 3, in step S11, the CPU 22 starts acquiring access logs. Then, the processing proceeds to step S12. The access log includes an access time, an access type (such as tampering, reading, and deleting), an accessed file or directory, and a process name. In the first exemplary embodiment, the CPU 22 temporarily stores, in the RAM 26, an access log in the recording range among the acquired access logs, and writes the access logs in the storage 30 at a predetermined time point. Accordingly, the access log is recorded by the CPU 22 writing data from the RAM 26 (which is a main storage device) to the storage 30 (which is an auxiliary storage device).

In step S12, the CPU 22 determines whether a certain time has elapsed since the acquisition of the access logs is started, and when the CPU 22 determines that the certain time has elapsed (step S12: YES), the processing proceeds to step S13. On the other hand, when the CPU 22 determines that the certain time has not elapsed (step S12: NO), the CPU 22 performs step S12 again. In the first exemplary embodiment, the certain time in step S12 is set to one hour.

In step S13, the CPU 22 determines whether the load on the hardware resources (see FIG. 1) of the multifunction apparatus 10 such as the CPU 22 and the ROM 24 is below a predetermined lower limit, and when the CPU 22 determines that the load is below the predetermined lower limit (step S13: YES), the processing proceeds to step S15. On the other hand, when the CPU 22 determines that the load is not below the predetermined lower limit (step S13: NO), the processing proceeds to step S14. In the first exemplary embodiment, when the number of access logs in the recording range recorded per hour is less than ten (10), the CPU 22 determines that the load is below the predetermined lower limit.

In step S14, the CPU 22 determines whether the load on the hardware resources (see FIG. 1) of the multifunction apparatus 10 exceeds a predetermined upper limit, and when the CPU 22 determines that the load exceeds the predetermined upper limit (step S14: YES), the processing proceeds to step S16. On the other hand, when the CPU 22 determines that the load does not exceed the predetermined upper limit (step S14: NO), the processing proceeds to step S17. In the first exemplary embodiment, when the number of access logs in the recording range recorded per hour exceeds 10,000, the CPU 22 determines that the load exceeds the predetermined upper limit.

In step S15, the CPU 22 broadens and updates the recording range set in step S10. Then, the processing ends. In the first exemplary embodiment, as an update for broadening the recording range, the recording range is broadened from a current recording range to a next higher layer shown in FIG. 4. Therefore, for example, when the recording range set in step S10 is "everything under /var/www/html/(-r)", the CPU 22 updates the recording range to "everything under /var/www/(-r)" in step S15 (see FIG. 4).

In step S16, the CPU 22 narrows and updates the recording range set in step S10. Then, the processing ends. In the first exemplary embodiment, as an update for narrowing the recording range, the recording range is narrowed from a current recording range to a next lower layer shown in FIG. 4. Therefore, for example, when the recording range set in step S10 is "everything under /var/www/html/(-r)", the CPU 22 updates the recording range to "/var/www/html/* and /var/www/html/*/*" in step S16 (see FIG. 4).

In step S17, the CPU 22 maintains the recording range set in step S10. Then, the processing ends.

As described above, in the first exemplary embodiment, when the CPU 22 detects the unauthorized access to a file or directory, the CPU 22 sets a range including at least the specific file or directory subjected to the unauthorized access as the recording range in which access logs are recorded. After setting the recording range, the CPU 22 updates or maintains the recording range according to the load on the hardware resources of the multifunction apparatus 10 (see FIG. 1). The load includes not only loads applied to the CPU 22 and the ROM 24, but also a load of a disk I/O generated based on reading and writing of data between the RAM 26 (which is the main storage device) and the storage 30 (which is the auxiliary storage device).

That is, in the first exemplary embodiment, by setting the recording range and recording a part of the acquired access logs, a use of the hardware resources (see FIG. 1) of the multifunction apparatus 10 required for recording is restricted. In the first exemplary embodiment, after setting the recording range, the scope of the recording range can be dynamically changed by updating the recording range according to the load on the hardware resources. Therefore, in the first exemplary embodiment, for example, when the load is small, the recording range is broadened and the number of files or directories to be recorded in the access log is increased, so that more access logs can be recorded.

As described above, according to the first exemplary embodiment, the use of the hardware resources (see FIG. 1) of the multifunction apparatus 10 required for recording can be limited as compared with a configuration in which all acquired access logs are recorded, and a possibility of acquiring an access log related to unauthorized access can be increased as compared with a configuration in which only access logs within a predetermined range are recorded. Accordingly, according to the first exemplary embodiment, many access logs can be recorded while functions and performances that the multifunction apparatus 10 should originally provide are achieved.

In the first exemplary embodiment, when the load on the hardware resources (see FIG. 1) of the multifunction apparatus 10 exceeds the predetermined upper limit, the CPU 22 performs narrows and updates the recording range. That is, in the first exemplary embodiment, when the load exceeds the predetermined upper limit, it is determined that there is a risk that functioning of the multifunction apparatus 10 is hindered, for example, that other processing may delay, and the number of files or directories to be recorded in the access log is reduced. Therefore, according to the first exemplary embodiment, when the load exceeds the predetermined upper limit, the recording range can be limited and the load can be reduced.

In the first exemplary embodiment, when the load on the hardware resources (see FIG. 1) of the multifunction apparatus 10 is below the predetermined lower limit, the CPU 22 broadens and updates the recording range. That is, in the first exemplary embodiment, when the load is below the predetermined lower limit, it is determined that the functioning of the multifunction apparatus 10 is not hindered, and the number of files or directories to be recorded in the access log is increased. Accordingly, according to the first exemplary embodiment, when the load is below the predetermined lower limit, the access log can be acquired in a broader recording range by using a margin of the load.

In the first exemplary embodiment, when the load on the hardware resources (see FIG. 1) of the multifunction apparatus 10 exceeds the predetermined lower limit and is below the predetermined upper limit, the CPU 22 maintains the recording range. Therefore, according to the first exemplary embodiment, a range of the load for maintaining the recording range can be specified.

In the first exemplary embodiment, the CPU 22 derives the load on the hardware resources (see FIG. 1) of the multifunction apparatus 10 using the number of the access logs in the recording range per unit time (for example, one hour). Specifically, in the first exemplary embodiment, when the number of the access logs in the recording range per unit time (for example, one hour) exceeds 10,000, the CPU 22 derives the load as a load that may hinder the functioning of the multifunction apparatus 10. On the other hand, in the first exemplary embodiment, when the number of the access logs in the recording range per unit time (for example, one hour) is below 10, the CPU 22 derives the load as a load that does not hinder the functioning of the multifunction apparatus 10.

As described above, according to the first exemplary embodiment, a cause that affects the increase or decrease of the load on the hardware resources (see FIG. 1) of the multifunction apparatus 10 is specified.

Second Exemplary Embodiment

Next, a second exemplary embodiment will be described while omitting or simplifying redundant description that has been made in the first exemplary embodiment.

In the second exemplary embodiment, different from the first exemplary embodiment, plural "predetermined upper limits" and plural "predetermined lower limits" of the load on the hardware resources (see FIG. 1) of the multifunction apparatus 10 are provided. Specifically, two predetermined upper limits are provided, that is, a first upper limit and a second upper limit at which the load is larger than the first upper limit, and two predetermined lower limits are provided, that is, a first lower limit and a second lower limit at which the load is smaller than the first lower limit.

In the second exemplary embodiment, in step S13 shown in FIG. 3, when the CPU 22 determines that the load is below the predetermined lower limit (step S13: YES), the processing does not proceed to step S15, but to step S20 shown in FIG. 5. In the second exemplary embodiment, in step S14 shown in FIG. 3, when the CPU 22 determines that the load exceeds the predetermined upper limit (step S14: YES), the processing does not proceed to step S16, but to step S30 shown in FIG. 6.

Details thereof will be described below.

Figure 5:
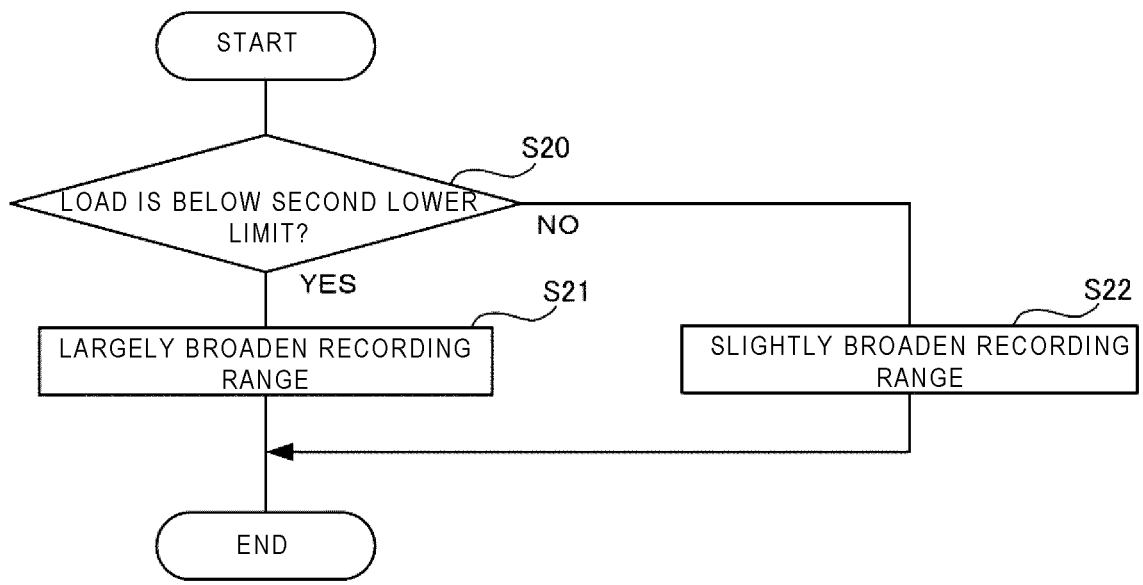
FIG. 5 is a flowchart of processing for determining a method for broadening the recording range.

When the CPU 22 determines "YES" in step S13 shown in FIG. 3, the processing proceeds to step S20 shown in FIG. 5. In step S20, the CPU 22 determines whether the load on the hardware resources (see FIG. 1) of the multifunction apparatus 10 is below the second lower limit. When the CPU 22 determines that the load is below the second lower limit (step S20: YES), the processing proceeds to step S21. When the CPU 22 determines that the load is not below the second lower limit (step S20: NO), the processing proceeds to step S22. In the second exemplary embodiment, when the number of access logs in the recording range recorded per hour is less than five (5), the CPU 22 determines that the load is below the second lower limit. In the second exemplary embodiment, when the number of access logs in the recording range recorded per hour is less than ten (10), the CPU 22 determines that the load is below the first lower limit.

In step S21, the CPU 22 largely broadens and updates the recording range set in step S10. Then, the processing ends. In the second exemplary embodiment, as an update for largely broadening the recording range, the recording range is broadened from a current recording range to a next two higher layer shown in FIG. 4. Therefore, for example, when the recording range set in step S10 is "/var/www/html/* and /var/www/html/*/*", the CPU 22 updates the recording range to "everything under /var/www/(-r)" in step S21 (see FIG. 4).

In step S22, the CPU 22 slightly broadens and updates the recording range set in step S10. Then, the processing ends. In the second exemplary embodiment, as an update for slightly broadening the recording range, the recording range is broadened from the current recording range to a next higher layer shown in FIG. 4. Therefore, for example, when the recording range set in step S10 is "/var/www/html/* and /var/www/html/*/*", the CPU 22 updates the recording range to "everything under /var/www/html/(-r)" in step S22 (see FIG. 4).

Figure 6:
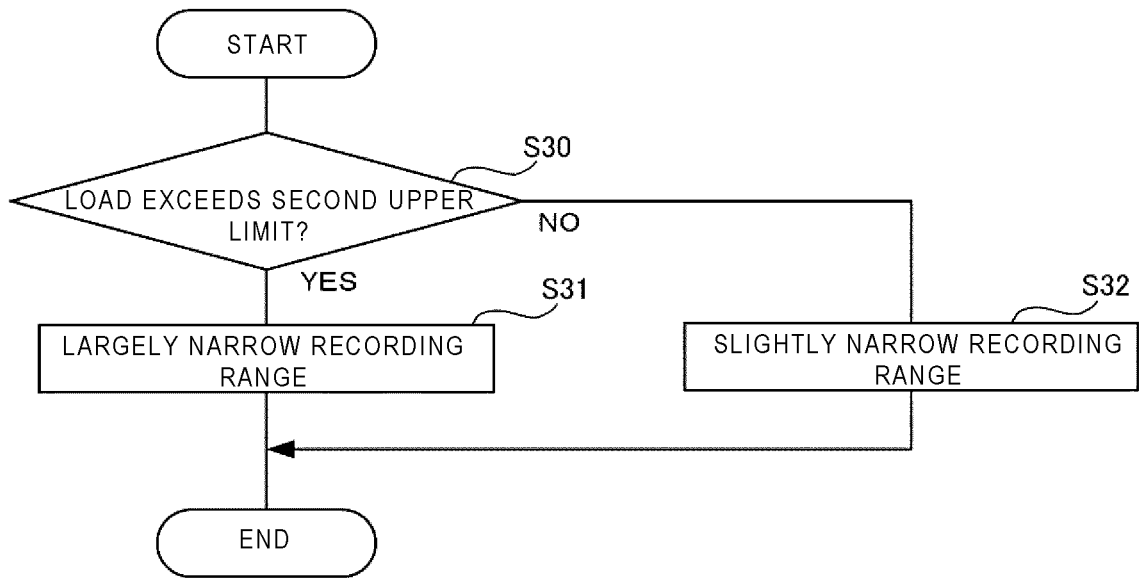
FIG. 6 is a flowchart of processing for determining a method for narrowing the recording range.

When the CPU 22 determines "YES" in step S14 shown in FIG. 3, the processing proceeds to step S30 shown in FIG. 6. In step S30, the CPU 22 determines whether the load on the hardware resources (see FIG. 1) of the multifunction apparatus 10 exceeds the second upper limit. When the CPU 22 determines that the load exceeds the second upper limit (step S30: YES), the processing proceeds to step S31. When the CPU 22 determines that the load does not exceed the second upper limit (step S30: NO), the processing proceeds to step S32. In the second exemplary embodiment, when the number of access logs in the recording range recorded per hour exceeds 20,000, the CPU 22 determines that the load exceeds the second upper limit. In the second exemplary embodiment, when the number of access logs in the recording range recorded per hour exceeds 10,000, the CPU 22 determines that the load exceeds the first upper limit.

In step S31, the CPU 22 largely narrows and updates the recording range set in step S10. Then, the processing ends. In the second exemplary embodiment, as an update for largely narrowing the recording range, the recording range is narrowed from a current recording range to a next two lower layer shown in FIG. 4. Therefore, for example, when the recording range set in step S10 is "/var/www/html/* and /var/www/html/*/*", the CPU 22 updates the recording range to "/var/www/html/index.html" in step S31 (see FIG. 4).

In step S32, the CPU 22 slightly narrows and updates the recording range set in step S10. Then, the processing ends. In the second exemplary embodiment, as an update for slightly narrowing the recording range, the recording range is narrowed from the current recording range to a next lower layer shown in FIG. 4. Therefore, for example, when the recording range set in step S10 is "/var/www/html/* and /var/www/html/*/*", the CPU 22 updates the recording range to "/var/www/html/*" in step S32 (see FIG. 4).

As described above, in the second exemplary embodiment, the CPU 22 sets the updated recording range when the load on the hardware resources (see FIG. 1) of the multifunction apparatus 10 exceeds the second upper limit to be narrower than the updated recording range when the load is equal to or greater than the first upper limit and equal to or less than the second upper limit. Therefore, according to the second exemplary embodiment, the recording range can be limited stepwisely as compared with a configuration in which the predetermined upper limit has one type.

In the second exemplary embodiment, the CPU 22 sets the updated recording range when the load on the hardware resources (see FIG. 1) of the multifunction apparatus 10 is below the second lower limit to be broader than the updated recording range when the load is equal to or greater than the second lower limit and equal to or less than the first lower limit. Therefore, according to the second exemplary embodiment, the recording range can be broadened stepwisely as compared with a configuration in which the predetermined lower limit has one type.

Third Exemplary Embodiment

Next, a third exemplary embodiment will be described while omitting or simplifying redundant description that has been made in the first or second exemplary embodiment.

In the third exemplary embodiment, unlike the other exemplary embodiments, the load on the hardware resources (see FIG. 1) of the multifunction apparatus 10 is derived using a change in a job performance. The change in the job performance is a change in processing time of a job corresponding to copying, printing, or scanning.

Details thereof will be described below with reference to FIG. 7.

Figure 7:
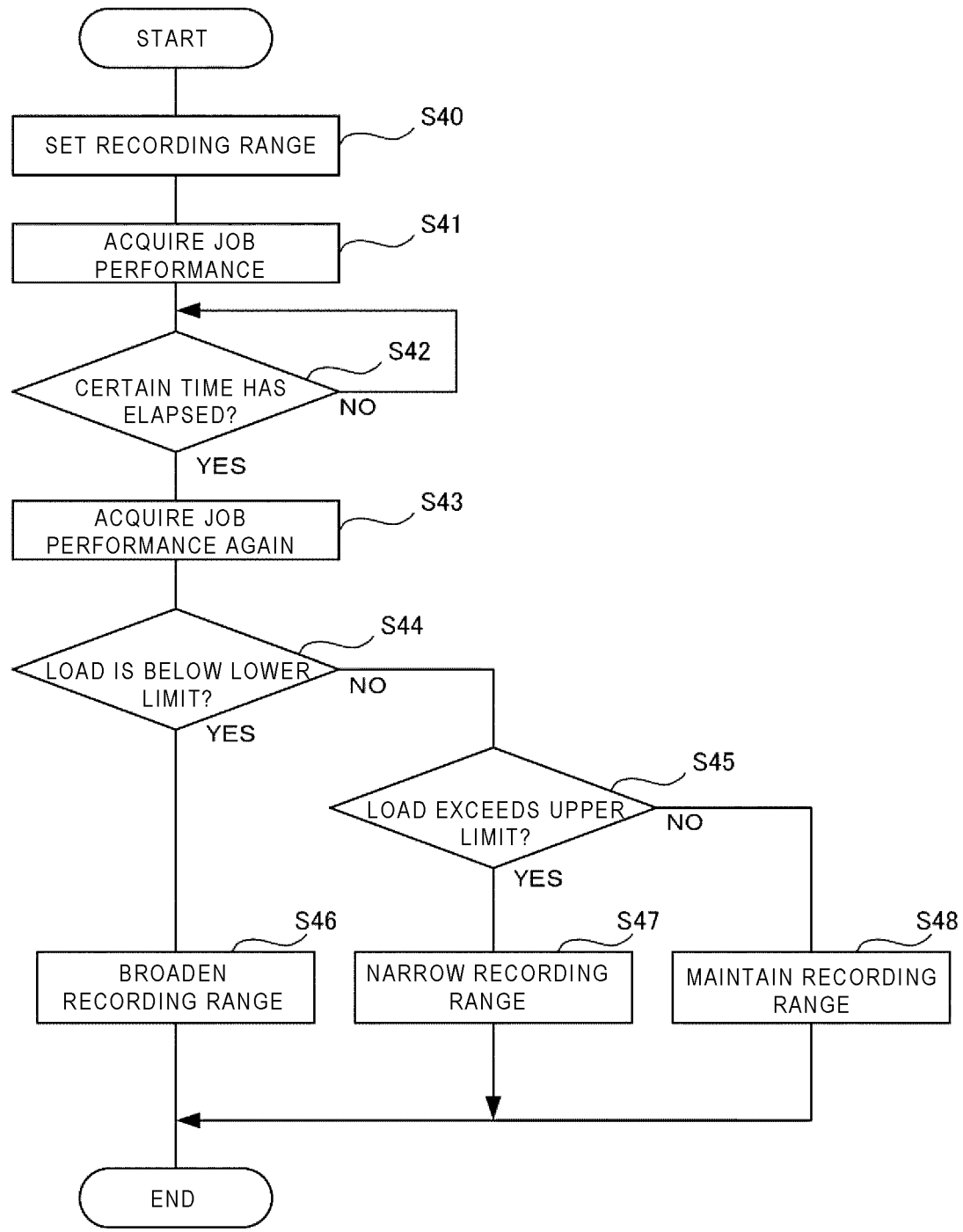
FIG. 7 is a second flowchart of processing for updating or maintaining the recording range.

In step S40 shown in FIG. 7, the CPU 22 sets a recording range. Then, the processing proceeds to step S41.

In step S41, the CPU 22 acquires the job performance. Then, the processing proceeds to step S42. In the third exemplary embodiment, the CPU 22 acquires a processing time of a copy job per predetermined number of sheets, as the job performance. For example, the CPU 22 acquires a copy time required to complete copying 10 sheets. The job performance such as the copy time acquired here serves as a reference for comparison with the job performance which will be acquired again in step S43 described later. A predetermined ratio or value with respect to the reference is used as a threshold for setting the recording range.

In step S42, the CPU 22 determines whether a certain time has elapsed since the recording range is set in step S40. When the CPU 22 determines that the certain time has elapsed (step S42: YES), the processing proceeds to step S43. On the other hand, when the CPU 22 determines that the certain time has not elapsed (step S42: NO), the CPU 22 performs step S42 again. In the third exemplary embodiment, the certain time in step S42 is set to one hour.

In step S43, the CPU 22 acquires the job performance, which is acquired in step S41, again. Then, the processing proceeds to step S44.

In step S44, the CPU 22 determines whether the load on the hardware resources (see FIG. 1) of the multifunction apparatus 10 is below a predetermined lower limit. When the CPU 22 determines that the load is below the predetermined lower limit (step S44: YES), the processing proceeds to step S46. On the other hand, when the CPU 22 determines that the load is not below the predetermined lower limit (step S44: NO), the processing proceeds to step S45. In the third exemplary embodiment, when the processing time of the copy job acquired in step S43 is shorter than the processing time of the copy job acquired in step S41 by two seconds or more, the CPU 22 determines that the load is below the predetermined lower limit.

In step S45, the CPU 22 determines whether the load on the hardware resources (see FIG. 1) of the multifunction apparatus 10 exceeds a predetermined upper limit. When the CPU 22 determines that the load exceeds the predetermined upper limit (step S45: YES), the processing proceeds to step S47. On the other hand, when the CPU 22 determines that the load does not exceed the predetermined upper limit (step S45: NO), the processing proceeds to step S48. In the third exemplary embodiment, when the processing time of the copy job acquired in step S43 is longer than the processing time of the copy job acquired in step S41 by two seconds or more, the CPU 22 determines that the load exceeds the predetermined upper limit.

In step S46, the CPU 22 broadens and updates the recording range set in step S40. Then, the processing ends.

In step S47, the CPU 22 narrows and updates the recording range set in step S40. Then, the processing ends.

In step S48, the CPU 22 maintains the recording range set in step S40. Then, the processing ends.

As described above, in the third exemplary embodiment, the CPU 22 acquires a change in the processing time of a job corresponding to copying, printing, or scanning as a change in job performance, and the load on the hardware resources (see FIG. 1) of the multifunction apparatus 10 is derived using the acquired change in the job performance. Therefore, according to the third exemplary embodiment, whether the processing time of the job of the multifunction apparatus 10 affects the increase or decrease of the load is specified.

Others

In the above exemplary embodiments, the recording range is updated by moving to an upper directory or a lower directory. However, the present disclosure is not limited to this. The recording range may be updated as follows.

FIG. 8 shows another example of a predetermined prior definition of the recording range. In FIG. 8, two columns of "protocol" and "related directory" are provided. Specific examples are listed in each column. For example, in a case of the protocol "HTTPS", "/var/www/" and "/etc/httpd/" are exemplified as directories related to the protocol.

Here, when a current recording range is set to "/var/www/", in the update for broadening the recording range, the recording range may be set to "/var/www/ and /etc/httpd/", or be set to "/etc/ipsec/" which is a directory related to the protocol "IPSEC" in addition to "/var/www". When the current recording range is "/var/www/ and /etc/httpd/", the update for narrowing the recording range may set the recording range only to "/var/www/" or "/etc/httpd/".

As described above, updating the recording range is not limited to moving to an upper directory or a lower directory, but may be changed in units of protocols or in units of related directories.

In the above exemplary embodiments, an access to a file or directory not listed in the white list shown in FIG. 2 is detected as an unauthorized access by the CPU 22. The method for detecting unauthorized access is not limited thereto. For example, access to a file or directory listed in a blacklist of files or directories to which access is not permitted may be detected as an unauthorized access.

In the above exemplary embodiments, the load on the hardware resources (see FIG. 1) of the multifunction apparatus 10 is derived using the number of access logs in the recording range per unit time or the change in job performance. Indicators used to derive the load are not limited thereto. For example, a usage rate of the CPU 22 may be an indicator used to derive the load. In the above exemplary embodiments, one of the above-described indicators is used to derive the load. The present disclosure is not limited thereto. Plural indicators may be used to derive the load. Further, in the above exemplary embodiments, when the job performance is used as an indicator used to derive the load, the processing time of the copy job has been employed as an example of the job performance. The present disclosure is not limited thereto. A processing time of a printing job or a scanning job is also applicable. The CPU 22 is not limited to acquiring the change in the processing time of one job among the copy job, the printing job, or the scanning job as the change in the job performance, but may acquire changes in processing times of plural jobs.

In the above exemplary embodiments, two predetermined upper limits are provided, which are the first upper limit and the second upper limit, and two predetermined lower limits are provided, which are the first lower limit and the second lower limit. The present disclosure is not limited to this example. Three or more predetermined upper limits and three or more predetermined lower limits may be provided.

In the above exemplary embodiments, the case where an unauthorized access to a file is detected has been described as an example. When an unauthorized access to a directory is detected, similar processing to that in the above exemplary embodiments is performed.

The exemplary embodiment may be combined as appropriate.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
     when detecting an unauthorized access to a file or a directory, set a range including at least the specific file or directory subjected to the unauthorized access as a recording range in which access logs are recorded; and
     after setting the recording range, update or maintain the recording range according to at least a load on a resource used to record the access logs.

2. The information processing apparatus according to claim 1, wherein
   the processor is configured to, when the load exceeds a predetermined upper limit, narrow and update the recording range.

3. The information processing apparatus according to claim 2, wherein
   the predetermined upper limit includes a plurality of predetermined upper limits including a first upper limit and a second upper limit at which the load is larger than the first upper limit, and
   the processor is configured to set an updated recording range when the load exceeds the second upper limit to be narrower than an updated recording range when the load is equal to or more than the first upper limit and is equal to or less than the second upper limit.

4. The information processing apparatus according to claim 3, wherein
   the processor is configured to, when the load is below a predetermined lower limit, broaden and update the recording range.

5. The information processing apparatus according to claim 4, wherein
   the predetermined lower limit includes a plurality of predetermined lower limits including a first lower limit and a second lower limit at which the load is smaller than the first lower limit, and
   the processor is configured to set an updated recording range when the load is below the second lower limit to be broader than an updated recording range when the load is equal to or more than the second lower limit and is equal to or less than the first lower limit.

6. The information processing apparatus according to claim 4, wherein
   the processor is configured to derive the load using at least one of (i) the number of access logs in the recording range per unit time, (ii) a usage rate of the processor, or (iii) a change in job performance.

7. The information processing apparatus according to claim 3, wherein
   the processor is configured to derive the load using at least one of (i) the number of access logs in the recording range per unit time, (ii) a usage rate of the processor, or (iii) a change in job performance.

8. The information processing apparatus according to claim 2, wherein
   the processor is configured to, when the load is below a predetermined lower limit, broaden and update the recording range.

9. The information processing apparatus according to claim 8, wherein
   the predetermined lower limit includes a plurality of predetermined lower limits including a first lower limit and a second lower limit at which the load is smaller than the first lower limit, and
   the processor is configured to set an updated recording range when the load is below the second lower limit to be broader than an updated recording range when the load is equal to or more than the second lower limit and is equal to or less than the first lower limit.

10. The information processing apparatus according to claim 8, wherein
    the processor is configured to derive the load using at least one of (i) the number of access logs in the recording range per unit time, (ii) a usage rate of the processor, or (iii) a change in job performance.

11. The information processing apparatus according to claim 2, wherein
    the processor is configured to, when the load is equal to or more than a predetermined lower limit and equal to or less than the predetermined upper limit, maintain the recording range.

12. The information processing apparatus according to claim 2, wherein
    the processor is configured to derive the load using at least one of (i) the number of access logs in the recording range per unit time, (ii) a usage rate of the processor, or (iii) a change in job performance.

13. The information processing apparatus according to claim 1, wherein
    the processor is configured to, when the load is below a predetermined lower limit, broaden and update the recording range.

14. The information processing apparatus according to claim 13, wherein
    the predetermined lower limit includes a plurality of predetermined lower limits including a first lower limit and a second lower limit at which the load is smaller than the first lower limit, and
    the processor is configured to set an updated recording range when the load is below the second lower limit to be broader than an updated recording range when the load is equal to or more than the second lower limit and is equal to or less than the first lower limit.

15. The information processing apparatus according to claim 13, wherein
    the processor is configured to, when the load is equal to or more than the predetermined lower limit and equal to or less than a predetermined upper limit, maintain the recording range.

16. The information processing apparatus according to claim 13, wherein
    the processor is configured to derive the load using at least one of (i) the number of access logs in the recording range per unit time, (ii) a usage rate of the processor, or (iii) a change in job performance.

17. The information processing apparatus according to claim 1, wherein
the processor is configured to, when the load is equal to or more than a predetermined lower limit and equal to or less than a predetermined upper limit, maintain the recording range.

18. The information processing apparatus according to claim 1, wherein
the processor is configured to derive the load using at least one of (i) the number of access logs in the recording range per unit time, (ii) a usage rate of the processor, or (iii) a change in job performance.

19. The information processing apparatus according to claim 18, wherein
the information processing apparatus is a multifunction apparatus, and
the processor is configured to acquire a change in processing time of a job corresponding to copying, printing, or scanning, as the change in the job performance.

20. A non-transitory computer readable medium storing a program that causes a computer to execute information processing, the information processing comprising:
when an unauthorized access to a file or a directory is detected, setting a range including at least the specific file or directory subjected to the unauthorized access as a recording range in which access logs are recorded; and
after the setting the recording range, updating or maintaining the recording range according to at least a load on a resource used to record the access logs.

* * * * *